(12) United States Patent
Kuo et al.

(10) Patent No.: US 8,531,413 B2
(45) Date of Patent: Sep. 10, 2013

(54) TOUCH PANEL AND TOUCH DISPLAY PANEL

(75) Inventors: Chien-Chung Kuo, Taichung County (TW); Chun-Chi Chi, Taichung County (TW); Yu-Chen Liu, Taipei (TW)

(73) Assignee: Wintek Corporation, Taichung (TW)

( * ) Notice: Subject to any disclaimer, the term of this patent is extended or adjusted under 35 U.S.C. 154(b) by 787 days.

(21) Appl. No.: 12/711,254

(22) Filed: Feb. 24, 2010

(65) Prior Publication Data

US 2010/0214264 A1 Aug. 26, 2010

(30) Foreign Application Priority Data

Feb. 24, 2009 (TW) .............................. 98105783 A

(51) Int. Cl.
 *G06F 3/041* (2006.01)
(52) U.S. Cl.
 USPC ........... 345/173; 345/174; 345/175; 345/176; 178/18.09
(58) Field of Classification Search
 USPC .................. 345/173–179; 349/12, 117, 118, 349/119, 120; 178/18.09, 19.01, 19.05
 See application file for complete search history.

(56) References Cited

U.S. PATENT DOCUMENTS

| | | | |
|---|---|---|---|
| 5,579,036 A | 11/1996 | Yates, IV | |
| 5,631,805 A | 5/1997 | Bonsall | |
| 6,020,945 A | 2/2000 | Sawai et al. | |
| 6,411,344 B2 * | 6/2002 | Fujii et al. | 349/12 |
| 6,542,300 B2 * | 4/2003 | Umemoto | 359/487.02 |
| 7,084,933 B2 | 8/2006 | Oh et al. | |
| 7,961,276 B2 * | 6/2011 | Matsushima et al. | 349/98 |
| 2007/0279556 A1 * | 12/2007 | Wang et al. | 349/102 |

* cited by examiner

*Primary Examiner* — Lun-Yi Lao
*Assistant Examiner* — Olga Merkoulova
(74) *Attorney, Agent, or Firm* — Jianq Chyun IP Office

(57) ABSTRACT

A touch display panel and a touch panel therein are provided. The touch panel includes a first transparent supporter plate, a second transparent supporter plate, and a touch module. The second transparent supporter plate and the touch module are disposed over the first transparent supporter plate. The first transparent supporter plate and the second transparent supporter plate have optical anisotropy. The first transparent supporter plate has a first fast axis and a first slow axis, and the second transparent supporter plate has a second fast axis and a second slow axis. A direction of the second fast axis is substantially perpendicular to a direction of the first fast axis, and a direction of the second slow axis is substantially perpendicular to a direction of the first slow axis. The touch panel of the present invention is helpful to improve display quality of the touch display panel having the touch panel.

6 Claims, 5 Drawing Sheets

TOUCH PANEL AND TOUCH DISPLAY PANEL

CROSS-REFERENCE TO RELATED APPLICATION

This application claims the priority benefit of Taiwan application serial No. 98105783, filed on Feb. 24, 2010. The entirety of the above-mentioned patent application is hereby incorporated by reference herein and made a part of this specification.

BACKGROUND OF THE INVENTION

1. Field of the Invention

The present application relates to a touch display panel. More particularly, the present application relates to a touch panel which can improve display quality of a touch display panel having the touch panel.

2. Description of Related Art

A touch display panel is mainly composed of a display panel achieving a display function and a touch panel accomplishing a touch-sensing function. During fabrication of a touch module, a transparent supporter plate is frequently utilized for supporting the touch module. Here, the transparent supporter plate is in general made of a plastic material.

Nonetheless, the transparent supporter plate made of the plastic material may have optical anisotropy, thus negatively affecting the display quality of the touch display panel.

SUMMARY OF THE INVENTION

The present application is directed to a touch panel having a first transparent supporter plate and a second transparent supporter plate with different optical anisotropy, respectively, such that display quality of a touch display panel having the touch panel can be enhanced.

To embody and broadly describe the present invention, a touch panel is provided herein. The touch panel includes a first transparent supporter plate, a second transparent supporter plate, and a touch module. The second transparent supporter plate is disposed over the first transparent supporter plate, and the touch module is disposed over the first transparent supporter plate. The first transparent supporter plate and the second transparent supporter plate have optical anisotropy. Here, the first transparent supporter plate has a first fast axis and a first slow axis, and the second transparent supporter plate has a second fast axis and a second slow axis. A direction of the second fast axis is substantially perpendicular to a direction of the first fast axis, and a direction of the second slow axis is substantially perpendicular to a direction of the first slow axis.

A touch display panel is further provided herein. Since the touch display panel is equipped with the aforesaid touch panel, favorable display quality can be ensured.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

The First Embodiment

Figure 1:
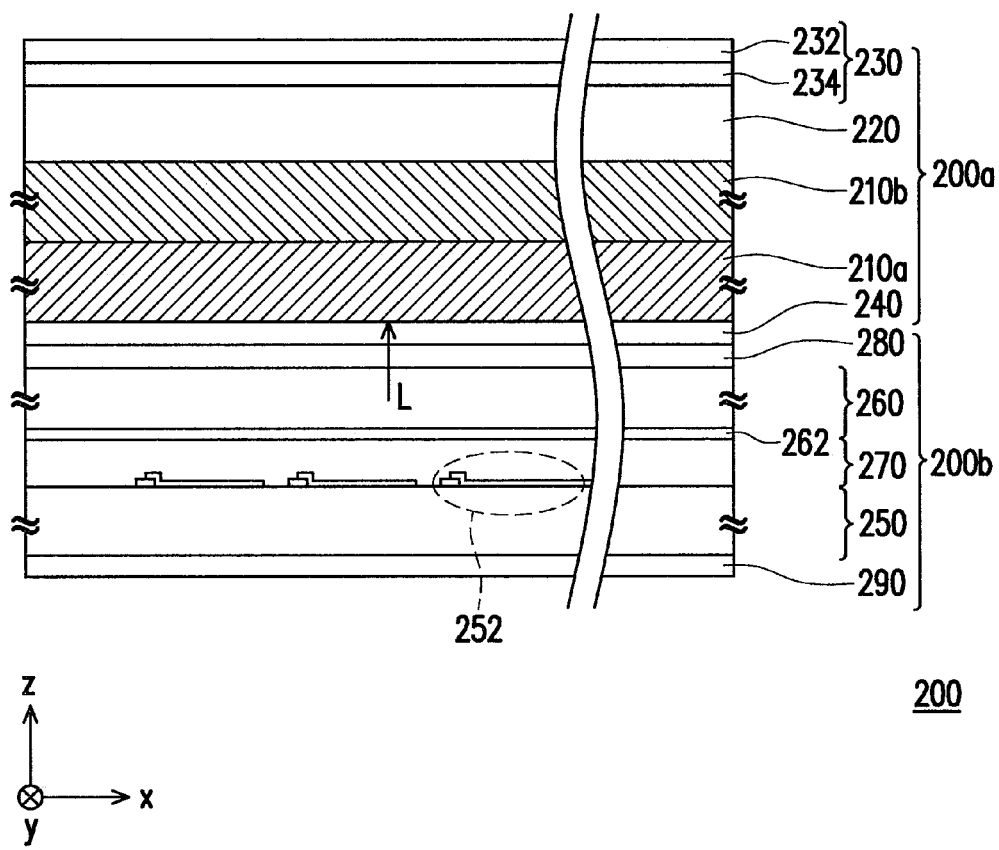
FIG. 1 is a schematic cross-sectional view of a touch display panel according to a first embodiment of the present invention.

FIG. 1 is a schematic cross-sectional view of a touch display panel according to a first embodiment of the present invention. As shown in FIG. 1, the touch display panel 200 of the present embodiment includes a touch panel 200a and a display panel 200b, and the touch panel 200a is disposed on the display panel 200b. More specifically, in a three-dimensional coordinate system, the touch display panel 200 is, for example, disposed on the x-y plane, and the touch panel 200a is, for example, stacked on the display panel 200b in a direction parallel to the z-axis. The display panel 200b includes a pixel array substrate 250, an opposite substrate 260, and a display medium layer 270. The display medium layer 270 is located between the pixel array substrate 250 and the opposite substrate 260. The pixel array substrate 250 has a plurality of pixel structures 252 arranged in array, and the opposite substrate 260 has an opposite electrode layer 262.

In the present embodiment, the touch module 220 in the touch panel 200a is, for example, a capacitive touch module or a resistance touch module. Nevertheless, the type of the touch module 220 is determined upon actual product requirements, which should not be construed as a limitation to the present invention. Besides, given that the display medium layer 270 is a liquid crystal layer, the display panel 200b of the present embodiment is, for example, a liquid crystal display (LCD) panel, which is not limited in the present invention.

The display panel 200b is equipped with an upper polarizer 280 and a lower polarizer 290. The upper polarizer 280 is disposed on the opposite substrate 260, and the lower polarizer 290 is disposed on the pixel array substrate 250. The opposite substrate 260 and the pixel array substrate 250 are located between the upper polarizer 280 and the lower polarizer 290. In the present embodiment, a light beam L passes through the upper polarizer 280 and the lower polarizer 290 and is then transformed into a linear polarization light beam to achieve a display function.

Referring to FIG. 1, the touch panel 200a of the present embodiment includes a first transparent supporter plate 210a, a second transparent supporter plate 210b, and a touch module 220. The second transparent supporter plate 210b is located between the first transparent supporter plate 210a and the touch module 220.

The touch panel 200a and the display panel 200b together form the touch display panel 200. To enhance display quality of the touch display panel 200, a phase retardation plate 234 and a circular polarizer 230 which is formed by a linear polarizer 232 and another phase retardation plate 234 can be further disposed in the touch panel 200a of the present embodiment. The touch module 220 is located between the circular polarizer 230 and the second transparent supporter plate 210b. The phase retardation plate 234 is located between the linear polarizer 232 and the touch module 220. The first transparent supporter plate 210a is located between the phase retardation plate 240 and the second transparent supporter plate 210b. In addition, both of the phase retardation plates 234 and 240 can provide λ/4 phase retardation. It should be mentioned that the circular polarizer 230 or the phase retardation plate 240 is disposed for promoting the display quality of the touch display panel 200 but not for limiting the present invention. Namely, whether the circular polarizer 230 or the phase retardation plate 240 is required is determined upon actual product requirements.

Figure 2:
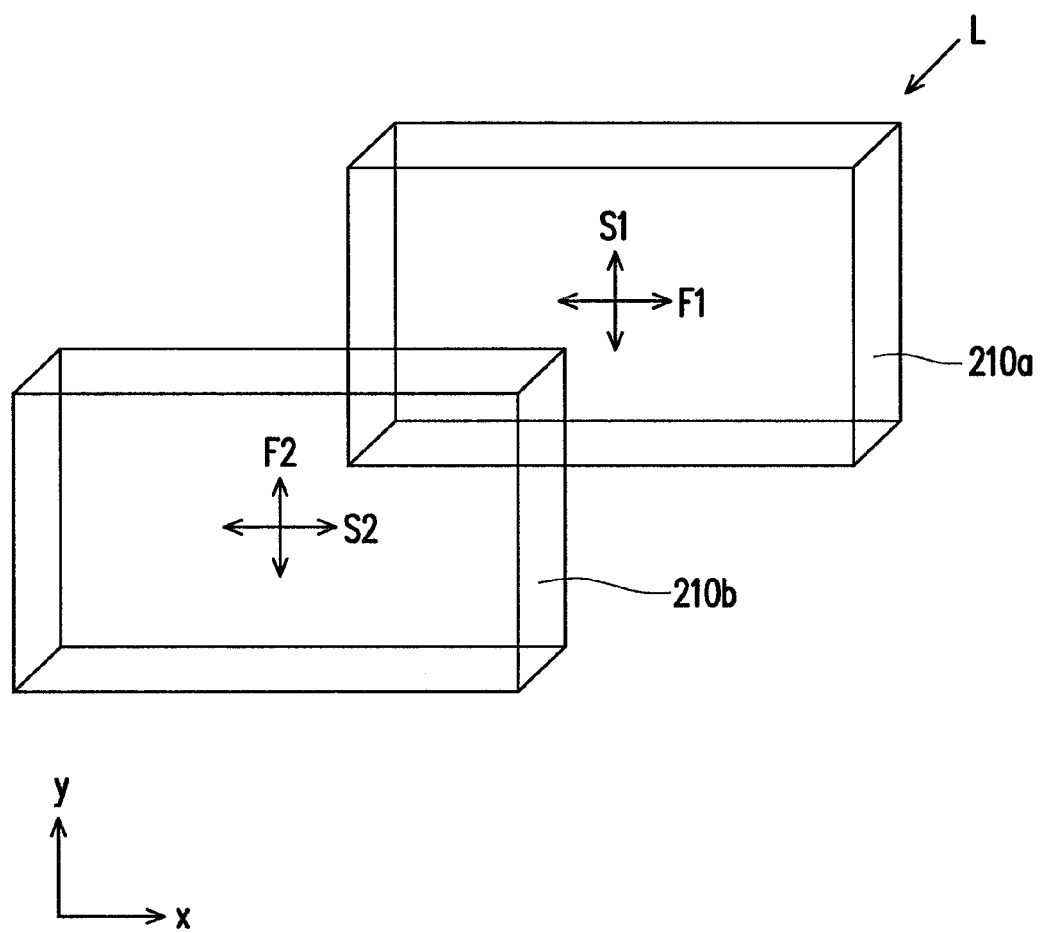
FIG. 2 is a schematic view of a first transparent supporter plate and a second transparent supporter plate in a touch panel depicted in FIG. 1.

FIG. 2 is a schematic view of the first transparent supporter plate and the second transparent supporter plate in the touch panel depicted in FIG. 1. As shown in FIG. 2, in the present embodiment, the first transparent supporter plate 210a and the second transparent supporter plate 210b have optical anisotropy. In terms of optical properties, the first transparent supporter plate 210a, as a matter of fact, has a first fast axis F1 and a first slow axis S1, while the second transparent supporter plate 210b has a second fast axis F2 and a second slow axis S2. In principle, the first transparent supporter plate 210a and the second transparent supporter plate 210b are made of materials which can provide low phase retardation.

In detail, according to the present embodiment, a direction of the second fast axis F2 is substantially perpendicular to a direction of the first fast axis F1, and a direction of the second slow axis S2 is substantially perpendicular to a direction of the first slow axis S1. To be more specific, the first transparent supporter plate 210a and the second transparent supporter plate 210b are often cut to be in a rectangular shape (with a long side and a short side) If the long side and the short side respectively serve as the x-axis and the y-axis in a coordinate graph, the direction of the first fast axis F1 and the direction of the first slow axis S1 of the first transparent supporter plate 210a are, for example, parallel to the x-axis and the y-axis, respectively. The direction of the second fast axis F2 and the direction of the second slow axis S2 of the second transparent supporter plate 210b are, for example, parallel to the y-axis and the x-axis, respectively. In brief, the directions of the first fast axis F1 and the second slow axis S2 are, for example, parallel to the x-axis, while the directions of the first slow axis S1 and the second fast axis F2 are, for example, parallel to the y-axis.

In the present embodiment, it should be noted that the directions of the first and the second fast axes F1 and F2, the directions of the first and the second slow axes S1 and S2, an included angle between the first fast axis F1 and the first slow axis S1, and an included angle between the second fast axis F2 and the second slow axis S2 are merely exemplary, which should not be construed as limitations to the present invention. That is to say, the directions of the first and the second fast axes F1 and F2 and the directions of the first and the second slow axes S1 and S2 can be random directions. Besides, the included angle between the first fast axis F1 and the first slow axis S1 and the included angle between the second fast axis F2 and the second slow axis S2 vary with the directions of the first and the second fast axes F1 and F2 and the directions of the first and the second slow axes S1 and S2.

Referring to FIGS. 1 and 2, when the light beam L emanates from the display panel 200b and is then input to the touch panel 200a, the light beam L sequentially passes through the first transparent supporter plate 210a and the second transparent supporter plate 210b. While the light beam L is passing through the first transparent supporter plate 210a, the optical anisotropy of the first transparent supporter plate 210a poses an influence on the light beam L, thus undermining the initial polarization state of the light beam L.

Thereafter, the light beam L is emitted from the first transparent supporter plate 210a and input into the second transparent supporter plate 210b. While the light beam L is passing through the second transparent supporter plate 210b, the optical anisotropy of the second transparent supporter plate 210b also poses an influence on the polarization state of the light beam L. According to the present embodiment, a direction of the optical anisotropy of the second transparent supporter plate 210b is substantially perpendicular to a direction of the optical anisotropy of the first transparent supporter plate 210a. Therefore, the second transparent supporter plate 210b of the present embodiment can effectively compensate the varied polarization state of the light beam L after the light beam L passes through the first transparent supporter plate 210a. In other words, images displayed after the light beam L passes through the touch panel 200a are roughly the same as images displayed after the light beam L emanates from the display panel 200b.

Based on the above, when the materials and the thicknesses of the first transparent supporter plate 210a and the second transparent supporter plate 210b are substantially equivalent, the phase retardation induced by the first transparent supporter plate 210a and the second transparent supporter plate 210b can be compensated in a more efficient manner. Thereby, the phase retardation arisen from the first transparent supporter plate 210a can be mostly compensated by the phase retardation induced by the second transparent supporter plate 210b. As such, the touch display panel 200 of the present embodiment can be equipped with rather satisfactory display quality.

To reduce the overall weight of products, the supporter plates are often made of plastic materials. Namely, for instance, the first transparent supporter plate 210a and the second transparent supporter plate 210b are made of a plastic material. A manufacturing method of the first transparent supporter plate 210a and the second transparent supporter plate 210b according to some embodiments of the present invention is discussed below.

Figure 3A:
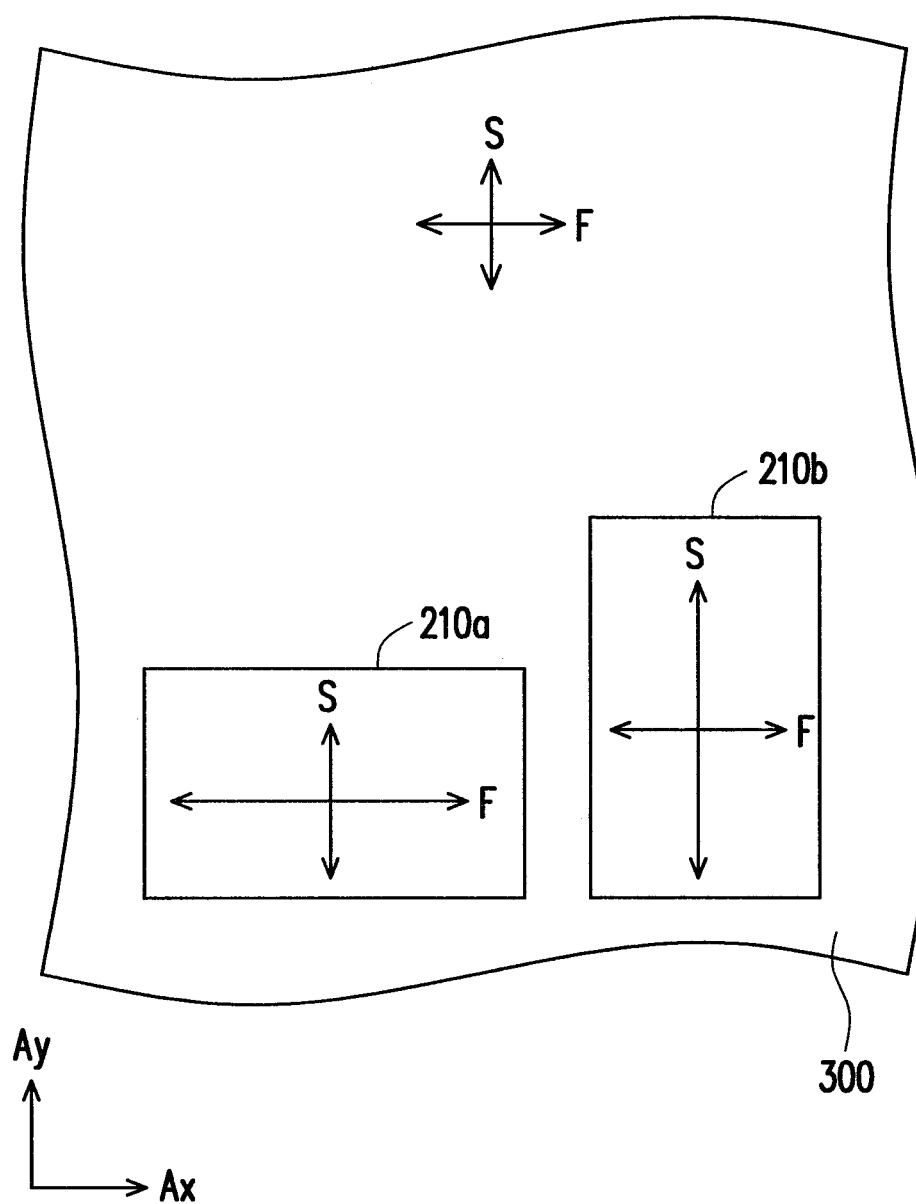
FIGS. 3A and 3B are schematic top views illustrating a process of manufacturing the first transparent supporter plate and the second transparent supporter plate according to an embodiment of the present invention.
Figure 3B:
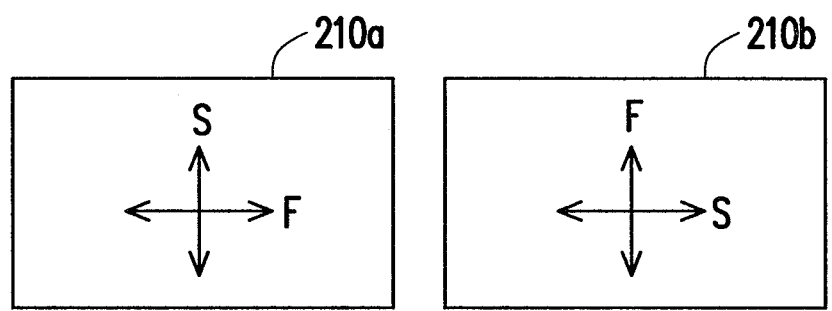

FIGS. 3A and 3B are schematic top views illustrating a process of manufacturing the first transparent supporter plate and the second transparent supporter plate according to an embodiment of the present invention. As shown in FIG. 3A, first, a mother board 300 is provided, and axes Ax and Ay serve as base axes for positioning in subsequent steps. Here, a direction of the base axis Ax is substantially perpendicular to a direction of the base axis Ay. Preferably, the mother board 300 is made of a material having optical properties of low phase retardation. Here, the material is, for instance, polycarbonate, polyethersulfone, or amorphous polyolefne. Certainly, the material of the mother board 300 is not limited in the present invention and can be determined upon actual requirements of products.

As indicated in FIG. 3A, the mother board 300 characterized by optical anisotropy has a fast axis F and a slow axis S. Next, as indicated in FIG. 3B, the range of a first transparent supporter plate 210a and a second transparent supporter plate 210b is marked on the mother board 300. In the present embodiment, the first transparent supporter plate 210a and the second transparent supporter plate 210b are in the same dimension, for example. Besides, sides of the first transparent supporter plate 210a are perpendicular to corresponding sides of the second transparent supporter plate 210b, for example. That is to say, when the first transparent supporter plate 210a and the second transparent supporter plate 210b are designed to be in a rectangular shape, the two long sides of the first transparent supporter plate 210a on the mother board 300 are perpendicular to the two long sides of the second transparent supporter plate 210b. Likewise, the two short sides of the first transparent supporter plate 210a are also perpendicular to the two short sides of the second transparent supporter plate 210b.

After that, a cutting process is performed along the aforesaid markings on the mother board 300 to cut off the first transparent supporter plate 210a and the second transparent supporter plate 210b. The fast axis F of the first transparent supporter plate 210a is substantially parallel to the two long sides of the first transparent supporter plate 210a, while the slow axis S of the first transparent supporter plate 210a is substantially parallel to the two short sides of the first transparent supporter plate 210a. On the other hand, the fast axis F of the second transparent supporter plate 210b is substantially parallel to the two short sides of the second transparent supporter plate 210b, while the slow axis S of the second transparent supporter plate 210b is substantially parallel to the two long sides of the second transparent supporter plate 210b.

Thereafter, the second transparent supporter plate 210b cut in the previous step is rotated by 90°, as indicated in FIG. 3B. The first transparent supporter plate 210a and the second transparent supporter plate 210b are then stacked together, such that the second transparent supporter plate 210b is disposed on the first transparent supporter plate 210a. As such, the arrangement of the first transparent supporter plate 210a and the second transparent supporter plate 210b is as illustrated in FIG. 1.

In the present embodiment, the fast axis F of the first transparent supporter plate 210a is perpendicular to the fast axis F of the second transparent supporter plate 210b. Likewise, the slow axis S of the first transparent supporter plate 210a is perpendicular to the slow axis S of the second transparent supporter plate 210b. Therefore, owing to the complementary optical anisotropy of the stacked first and second transparent supporter plates 210a and 210b, it is not apt to induce unnecessary phase retardation after the light beam passes through the two stacked supporter plates 210a and 210b.

As a matter of fact, the first transparent supporter plate 210a and the second transparent supporter plate 210b can also be formed by other methods in addition to the method described above. For instance, according to another embodiment, the first transparent supporter plate 210a and the second transparent supporter plate 210b can be respectively formed by cutting different mother boards 300. Next, the optical anisotropy of the first transparent supporter plate 210a and the optical anisotropy of the second transparent supporter plate 210b are individually measured by means of optical instruments or other equipment. Thereafter, based on the principle discussed in the previous embodiment, the first transparent supporter plate 210a and the second transparent supporter plate 210b with complementary optical anisotropy are arranged. Note that fabrication methods of the two supporter plates 210a and 210b and arrangement thereof are determined upon actual demands, which should not be construed as limitations to the present invention.

The Second Embodiment

It can be learned from the first embodiment that the fast axis of the first transparent supporter plate 210a is substantially perpendicular to the fast axis of the second transparent supporter plate 210b. As such, the optical effects achieved by the first transparent supporter plate 210a and the second transparent supporter plate 210b can be mutually compensated. Other than the above arrangement in which the two supporter plates 210a and 210b are closely stacked, the two supporter plates 210a and 210b can also be arranged in a different manner. In the following embodiment, another type of touch display panel is described.

Figure 4:
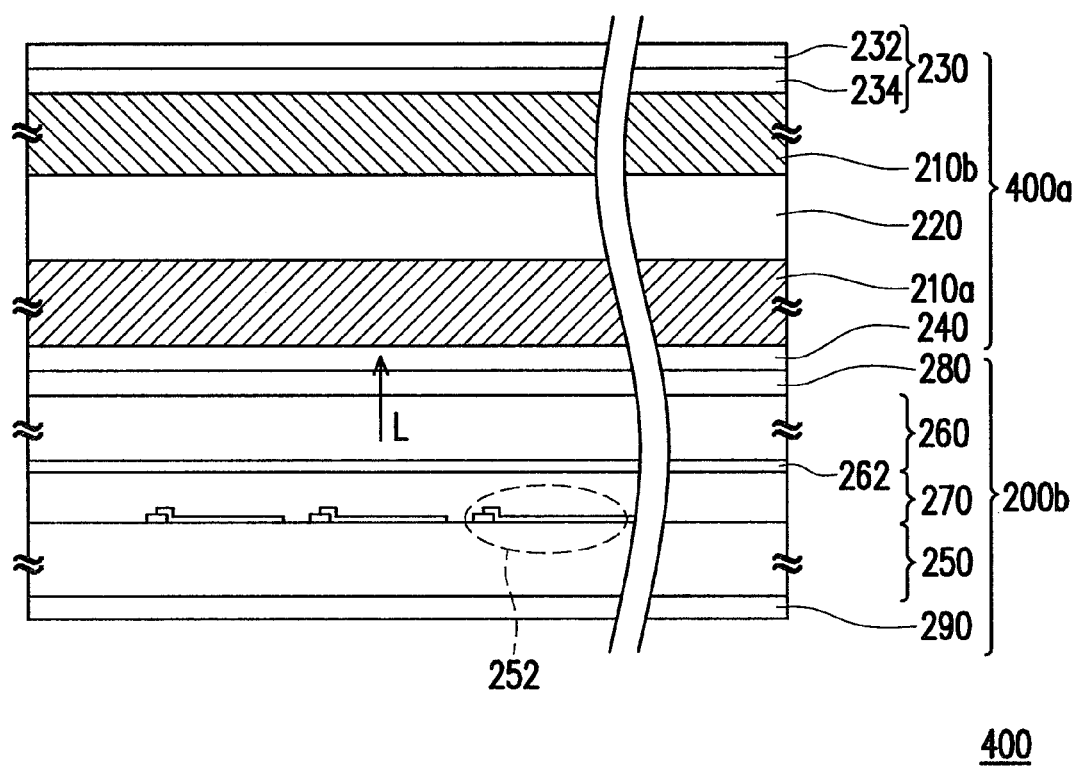
FIG. 4 is a schematic cross-sectional view of a touch display panel according to a second embodiment of the present invention.

FIG. 4 is a schematic cross-sectional view of a touch display panel according to a second embodiment of the present invention. The touch display panel 400 of the present embodiment as depicted in FIG. 4 has similar elements to those of the touch display panel 200 of the first embodiment, and identical or similar reference numbers denote identical or similar elements. The main difference between the touch display panel 400 and the touch display panel 200 lies in the arrangement of the first transparent supporter plate 210a and the second transparent supporter plate 210b. As indicated in FIG. 4, in the touch panel 400a of the present embodiment, the touch module 220 is in substance located between the first transparent supporter plate 210a, the second transparent supporter plate 210b and the touch module 220.

As advanced above, in order to accomplish favorable display quality of the touch display panel 400, the phase retardation plate 240 and the circular polarizer 230 which is formed by the linear polarizer 232 and another phase retardation plate 234 are also disposed in the touch panel 400a of the present embodiment.

It is worth mentioning that the touch module 220 of the present embodiment is sandwiched between the first transparent supporter plate 210a and the second transparent supporter plate 210b. The first transparent supporter plate 210a and the second transparent supporter plate 210b have complementary optical anisotropy. Accordingly, after the light beam L passes through the touch panel 400a, it is not apt to induce unnecessary phase retardation, such that images can be well displayed. In other words, the touch display panel 400 features desirable display quality.

On the other hand, the fabrication methods and the arrangement of the two supporter plates 210a and 210b can be referred to as those described in the first embodiment. Undoubtedly, the fabrication methods and the arrangement of the two supporter plates 210a and 210b are determined upon actual demands, which should not be construed as limitations to the present invention.

In the present embodiment, the touch module 220 in the touch panel 400a is, for example, a capacitive touch module or a resistance touch module. Nevertheless, the type of the touch module 220 is determined upon actual product requirements and is not limited in the present invention.

In light of the foregoing, after the light beam passes through the first transparent supporter plate and the second transparent supporter plate, the two supporter plates can be equipped with complementary optical anisotropy. Thereby, optical anisotropy of the touch panel is lessened, thus resulting in favorable display quality of the touch display panel having the aforesaid touch panel according to the present invention. On the other hand, the methods of forming the touch display panel and the touch panel therein according to the present invention are not rather distinctive from the methods of forming conventional touch display panel and the touch panel therein. In other words, the touch display panel and the touch panel therein can be extensively applied to a variety of touch display apparatuses.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
   a first transparent supporter plate having optical anisotropy, wherein the first transparent supporter plate has a first fast axis and a first slow axis;
   a second transparent supporter plate having optical anisotropy, the second transparent supporter plate being disposed over the first transparent supporter plate, and having a second fast axis and a second slow axis, wherein a direction of the second fast axis is substantially perpendicular to a direction of the first fast axis, and a direction of the second slow axis is substantially perpendicular to a direction of the first slow axis;
   a touch module disposed over the first transparent supporter plate, wherein the second transparent supporter plate is located between the first transparent supporter plate and the touch module;
   a circular polarizer; and
   a first phase retardation plate, the touch module being located between the circular polarizer and the second transparent supporter plate, wherein the circular polarizer comprises a linear polarizer and a second phase retardation plate, the first transparent supporter plate is located between the first phase retardation plate and the second transparent supporter plate, the second phase retardation plate is located between the linear polarizer and the touch module, and the first phase retardation plate and the second phase retardation plate both provide $\lambda/4$ phase retardation.

2. The touch panel as claimed in claim 1, wherein the first transparent supporter plate and the second transparent supporter plate are both made of same material comprising polycarbonate, polyethersulfone, or amorphous polyolefne, and a thickness of the first transparent supporter plate is substantially equal to a thickness of the second transparent supporter plate.

3. The touch panel as claimed in claim 1, wherein the touch module comprises a capacitive touch module or a resistance touch module.

4. A touch display panel, comprising:
   a display panel, comprising:
      a pixel array substrate comprising a plurality of pixel structures arranged in array;
      an opposite substrate;
      a polarizer disposed on the opposite substrate; and
         a display medium layer located between the pixel array substrate and the opposite substrate; and
   a touch panel disposed over the display panel and comprising:
      a first transparent supporter plate having optical anisotropy, wherein the first transparent supporter plate has a first fast axis and a first slow axis;
      a second transparent supporter plate having optical anisotropy, the second transparent supporter plate being disposed over the first transparent supporter plate and having a second fast axis and a second slow axis, wherein a direction of the second fast axis is substantially perpendicular to a direction of the first fast axis, and a direction of the second slow axis is substantially perpendicular to a direction of the first slow axis;
      a touch module disposed over the first transparent supporter plate, wherein the second transparent supporter plate is located between the first transparent supporter plate and the touch module;
      a circular polarizer; and
      a first phase retardation plate, the touch module being located between the circular polarizer and the second transparent supporter plate, wherein the circular polarizer comprises a linear polarizer and a second phase retardation plate, the first transparent supporter plate is located between the first phase retardation plate and the second transparent supporter plate, the second phase retardation plate is located between the linear polarizer and the touch module, and the first phase retardation plate and the second phase retardation plate both provide $\lambda/4$ phase retardation.

5. The touch display panel as claimed in claim 4, wherein the first transparent supporter plate and the second transparent supporter plate are both made of same material comprising polycarbonate, polyethersulfone, or amorphous polyolefne, and a thickness of the first transparent supporter plate is substantially equal to a thickness of the second transparent supporter plate.

6. The touch display panel as claimed in claim 4, wherein the touch module comprises a capacitive touch module or a resistance touch module.

* * * * *